United States Patent [19]

Nitzberg

[11] 4,239,721
[45] Dec. 16, 1980

[54] PROCESS FOR THE MANUFACTURE OF PATTERNED UREA THERMOPLASTIC MOLDING COMPOUND PREFORMS TO BE USED FOR THE PRODUCTION OF CONSISTENTLY PATTERNED BUTTONS WITH MOLDED HOLES

[76] Inventor: Leonard R. Nitzberg, 1413 Buckeye La., Knoxville, Tenn. 37919

[21] Appl. No.: 3,000

[22] Filed: Jan. 12, 1979

[51] Int. Cl.³ .................... B29C 17/00; B29C 25/00; B29G 2/00
[52] U.S. Cl. ............................... 264/157; 260/17.3; 264/176 R; 264/232; 264/239; 264/294; 264/297; 264/DIG. 34
[58] Field of Search .......... 264/157, 158, 148, 176 R, 264/DIG. 34, 232, 340, 210 R, 73, 75, 156, 245, 246, 247, 248, 210.1, 234, 320, 155, 322, 294, 239, 297; 260/9, 15, 17, 17.3, 29.4 R, 148; 528/259

[56] References Cited

U.S. PATENT DOCUMENTS

| | | | |
|---|---|---|---|
| 1,819,811 | 8/1931 | Clemens | 264/DIG. 34 |
| 1,944,464 | 1/1934 | Richardson | 264/148 |
| 2,022,895 | 12/1935 | Morrell | 264/148 |
| 2,573,050 | 10/1951 | Orsini | 264/75 |
| 2,689,981 | 9/1954 | McCarthy | 264/157 |
| 3,981,951 | 9/1976 | Richman | 264/157 |

OTHER PUBLICATIONS

Simonds et al., Handbook of Plastics, Van Nostrand, N.Y., (1944), pp. 193-198.

*Primary Examiner*—W. E. Hoag
*Attorney, Agent, or Firm*—Pitts & Kesterson

[57] ABSTRACT

A process for the manufacture of patterned urea thermoplastic molding compound preforms is disclosed where such preforms are suitable for the compressive thermocasting of buttons containing cast holes and displaying an undistorted and consistent pattern. The process utilizes commercially produced molding compound, pigment, adhesives, crystalligerous material plus water which are united to form pliable, self-adhesive aggregates of various colors or hues. These masses are volumetrically measured and/or formed and then assembled in various specific arrangements. This mass is then contained and compressed to expel excess air and cause adhesion of the constituents. The mass is then extruded to a consistently patterned soft rod of a specific diameter. The rod is subsequently sliced to a specific thickness and weight and then dried prior to shipment. In the preferred embodiment of the process, excessive drying is performed by thermal dehydration and necessary minimum water content levels are re-established by specifically prolonged exposure to supersaturated air.

15 Claims, 26 Drawing Figures

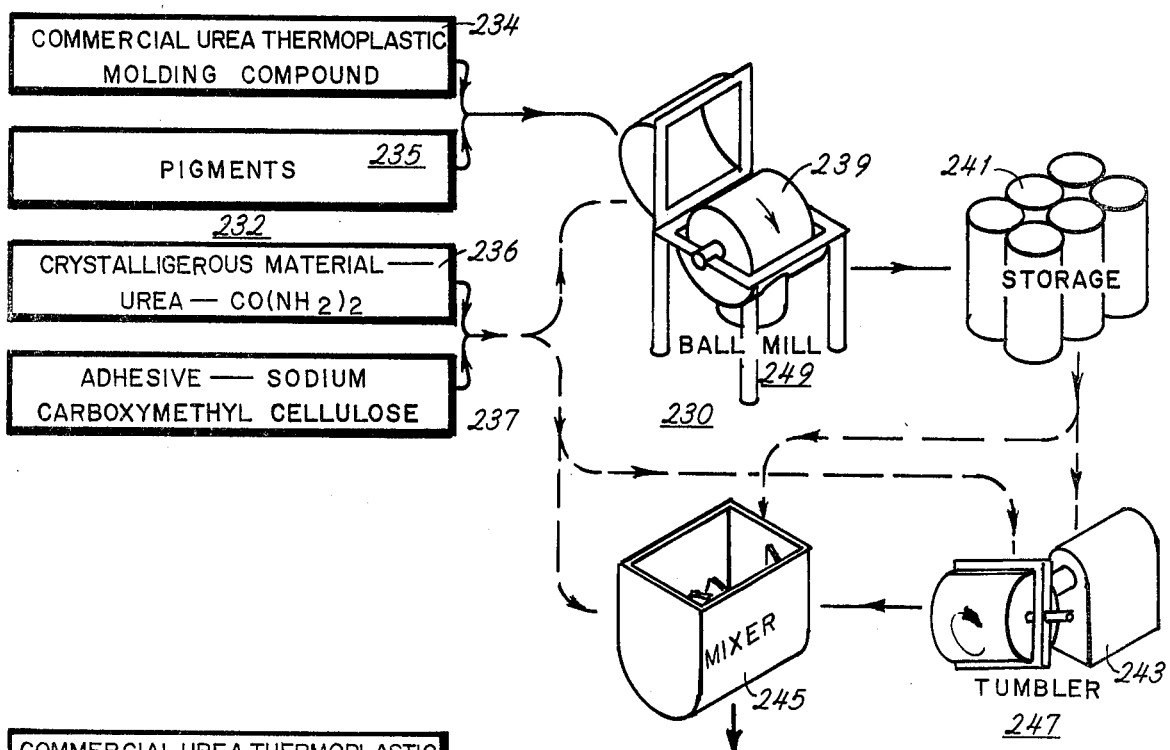
FIG. 9
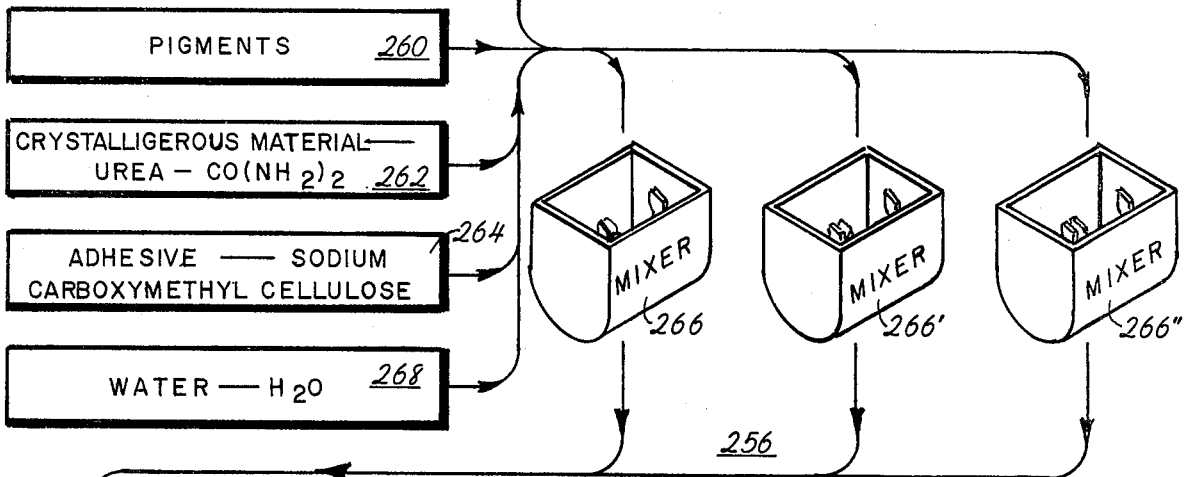
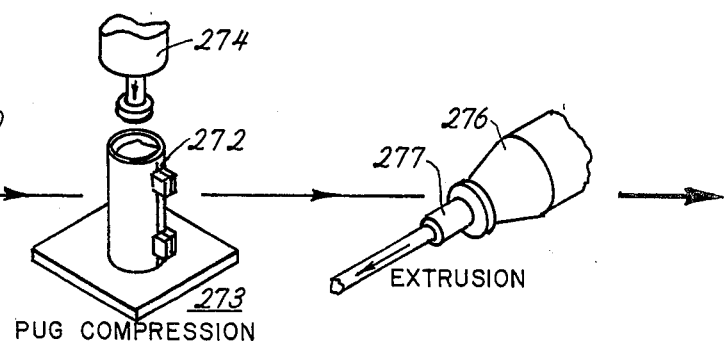
FIG. 10

TABLE I

| DESCRIPTION | MANUFACTURER | TRADE NAME |
|---|---|---|
| COMMERCIAL UREA THERMOPLASTIC MOLDING COMPOUND | AMERICAN CYNAMID CORP. INDUSTRIAL CHEMICALS DIV. WAYNE, N.J. | W-300 OR BEETLE |
| | ALLIED CHEMICAL CORP. TOLEDO, OHIO | UF-18-FP OR PLASCON |
| CRYSTALLIGEROUS MATERIAL OR COMMERCIAL UREA | VISTRON CORP. LIMA, OHIO | PRILLED UREA |
| SODIUM CARBOXYMETHYL CELLULOSE | HERCULESE INC. WILMINGTON, DEL. | GUM CELLULOSE |
| POTASSIUM CARBONATE | MALENKRODT CHEMICAL WORKS ST. LOUIS, MO. | — |
| PIGMENT — BURNT UMBER | PFIZER CHEMICAL CO. INC. NEWARK, N.J. | BU—5452 |
| PIGMENT — CADMIUM YELLOW | S.M.C. CORP. GLIDDEN-DURKEE DIV. BALTIMORE, MD. | CADMIUM PURE YELLOW |
| PIGMENT — TITANIUM WHITE | AMERICAN CYANAMID CORP. BOUND BROOK, N.J. | OR-650, UNITANE OR RUTTLE |
| PIGMENT — BLACK | C. WITHING CO. INC. PELHAM MANOR, N.Y. | BAYFEROX 319, E-9163 OR SEGIL BLACK |
| PIGMENT — GREEN | HERCULESE INC. IMPERIAL PIGMENTS & COLORS DIV. WILMINGTON, DEL. | X-2944 |

FIG. 21

TABLE 2

| MATERIAL | DESCRIPTION | AMOUNT | | |
|---|---|---|---|---|
| | | MIX 1 | MIX 2 | MIX 3 |
| UF-18-FP | UREA THERMOPLASTIC COMPOUND | 5,499.3 g | NONE | NONE |
| W-300 | UREA THERMOPLASTIC COMPOUND | 5,499.3 g | 10,957.3 g | 10,957.3 g |
| GUM CELLULOSE | SODIUM CARBOXYMETHYL CELLULOSE | 226.8 g | 226.8 g | 226.8 g |
| UREA | COMMERCIAL UREA | 113.4 g | 113.4 g | 113.4 g |
| BU-5452 | PIGMENT | 0.447 g | 0.206 g | 26.715 g |
| CADMIUM YEL. | PIGMENT | 0.402 g | 0.378 g | NONE |
| X-2944 | PIGMENT | 0.045 g | 0.043 g | NONE |
| SEGIL BLACK | PIGMENT | 0.089 g | 0.086 g | 15.584 g |
| OR-650 | PIGMENT | NONE | 41.576 g | NONE |
| NONE | WATER AT 60°C | 8,500.0 g | 8,500.0 g | 8,500.0 g |

FIG. 22

TABLE 3

| ASSEMBLY ORDER | ITEM | COLOR | DIMENSIONS | | | SPECIAL INSTRUCTIONS |
|---|---|---|---|---|---|---|
| | | | THICKNESS | LENGTH | WIDTH | |
| 1 & 2 | 125 & 125' | LIGHT BROWN | 25mm | 450mm | 75mm | NONE |
| 3 & 4 | 126 & 126' | DARK BROWN | 25mm | 450mm | 75mm | NONE |
| 5 & 6 | 127 & 127' | DARK BROWN | 25mm | 450mm | 75mm | NONE |
| 7 & 8 | 124 & 124' | LIGHT BROWN | 25mm | 450mm | 75mm | NONE |
| 9 & 10 | 128 & 128' | LIGHT BROWN | 20mm | 450mm | 200mm | NONE |
| 11 & 12 | 130 & 130' | WHITE | 20mm | 450mm | 175mm | NONE |
| 13 & 14 | 132 & 132' | LIGHT BROWN | 20mm | 450mm | 150mm | FOLD 132 AT 131 & 132' AT 131' |

FIG. 23

TABLE 4

| BUTTON SIZE (LIGNE) | EXTRUDER NOZZLE BORE (mm) | DRIED PREFORM DIAMETER (mm) |
|---|---|---|
| 12 to 17 | 12.00 | 9.5 |
| 18 to 22 | 14.28 | 11.1 |
| 23 to 27 | 15.74 | 12.7 |
| 30 to 34 | 20.33 | 17.5 |
| 40 to 45 | 28.58 | 25.4 |

FIG. 24

TABLE 5

| ASSEMBLY ORDER | ITEM | PUG CLAMP HALF | COLOR | DIMENSIONS THICKNESS | LENGTH | WIDTH | NOTES |
|---|---|---|---|---|---|---|---|
| 1 | 314 | 310 | RED | 33mm | 450mm | 250mm | NONE |
| 2 | 328 | 312 | RED | 33mm | 450mm | 250mm | NONE |
| 3 | 316 | 310 | RED | 20mm | 450mm | 160mm | NONE |
| 4 | 330 | 312 | RED | 20mm | 450mm | 160mm | NONE |
| 5 | 318 | 310 | RED | 30mm | 450mm | 250mm | NONE |
| 6 | 332 | 312 | BROWN | 30mm | 450mm | 250mm | NONE |
| 7 | 320 | 310 | RED | 20mm | 450mm | 300mm | NONE |
| 8 | 334 | 312 | RED | 20mm | 450mm | 300mm | NONE |
| 9 | 322 | 310 & 312 | BROWN | 15mm | 450mm | 500mm | NONE |
| 10 | 324 | 310 & 312 | RED | 20mm | 450mm | 500mm | NONE |
| 11 | 326 | 310 & 312 | WHITE | 12 | 450 | 500 | SEE NOTE #1 |

NOTE №1: ROLL ITEM 326 INTO THE GENERALLY ELIPTICAL CONFIGURATION INDICATED AT 327 AND PLACE ON 324 IN 312 AND CLOSE THE CLAMP.

FIG. 25

TABLE 6

| ASSEMBLY ORDER | ITEM | COLOR | DIMENSIONS | | | NOTES |
|---|---|---|---|---|---|---|
| | | | THICKNESS | LENGTH | WIDTH | |
| 1 | 356 | WHITE | 20mm | 450mm | 240mm | SEE NOTE N° 1 |
| 2 | 358 | DARK BLUE | 20mm | 450mm | 240mm | SEE NOTE N° 1 |
| 3 | 350 | LIGHT BLUE | 35mm | 450mm | 400mm | SEE NOTE N° 2 |
| 4 | 352 | LIGHT BLUE | 35mm | 450mm | 250mm | SEE NOTE N° 2 |
| 5 | 354 | LIGHT BLUE | 35mm | 450mm | 150mm | NONE |

NOTE N° 1: PLACE 356 DIRECTLY OVER 358 AND ROLL TIGHTLY TO FORM THE SPIRALLY PIGMENTED MASS GENERALLY INDICATED AT 368.

NOTE N° 2: PLACE MASS 368 ON 354 AND FOLD ENDS 360, 362, 364 AND 366 OVER MASS 368 BEFORE CLOSING SIDE 346.

FIG. 26

PROCESS FOR THE MANUFACTURE OF PATTERNED UREA THERMOPLASTIC MOLDING COMPOUND PREFORMS TO BE USED FOR THE PRODUCTION OF CONSISTENTLY PATTERNED BUTTONS WITH MOLDED HOLES

BACKGROUND OF THE INVENTION

This invention relates to a manufacturing process for the production of consistently patterned button preforms of pigmented urea thermoplastic molding compound suitable for being thermo-compressively cast into pigmently patterned buttons containing holes formed in the molding process. More specifically, this invention relates to the production of preforms from non-polluting commercially available material which results in a button preform which can be molded with holes, and whose shelf life can be extended by re-aquivation. Prior to the advent of this process, pigmented preforms were extremely brittle and it is belived became fractured or locally pulverized when they were compressively contacted by small protrusions in the molding cavity such as are used to form holes, causing pattern distortion. To prevent this distortion, buttons containing pigmented patterns were either patterned solely about the periphery of the finished product thereby permitting granulation of the interior without causing pattern and/or color distortion or else the buttons were cast in molds which did not contain protursions for the forming of holes. Holes were subsequently drilled into the buttons after the molded goods were deflashed; thereby adding a separate and costly operation to the manufacturing process. These techniques eliminated pattern distortion caused by forming of holes but limited production and design and/or significantly increased manufacturing costs. Additionally, prior to the advent of this process, the formulation procedure employed to produce the raw thermoplastic material entailed the use of formaldehyde and other highly toxic pollutants which limits the physical location of production facilities, increases production costs due to necessitated pollution control devices and presents a potential health and environmental hazard. Furthermore, due to dehydration the finished preforms prepared by prior methods had a shelf life of not more than two months when continuously exposed to the atmosphere.

Accordingly, it is an object of the present invention to provide a procedure for the manufacture and molding of variously patterned urea thermosetting plastic button preforms from commercially available, nonpolluting urea molding compounds, to produce a fracture resistant preform having extended shelf life and which molds without pattern distortion into buttons with holes. It is another object of this invention to use adaptations of standard, commercially available machinery and equipment to produce said preforms.

Other objects and advantages of the process will become apparent upon reading the following description and claims together with the drawings in which:

FIG. 9 is a schematic view describing a process which is an alternate embodiment of a portion of the preferred embodiment described in FIG. 1 and pertains to the mixing and blending of the dry constituents;

FIG. 10 is a schematic view describing a process which is an laternate embodiment of a portion of the preferred embodiment described in FIG. 1 and pertains to the preparation of randomly mottled material which approximates the coloration of marble;

FIG. 21 is a table listing the symbols used in the process to describe the material, the material's general description, manufacturer, manufacturer's address, and the manufacturer's part number;

FIG. 22 is a table listing the specific mixtures used for the particular materials;

FIG. 23 is a table describing the layering required to produce the pug clamp design indicated generally in FIG. 2;

FIG. 24 is a table giving extruder nozzle sizes and the resultant size of preforms;

FIG. 25 is a table describing the layering required to produce the pug clamp design indicated generally in FIG. 14;

FIG. 26 is a table describing the layering required to produce the pug clamp design indicated generally in FIG. 16.

Accordingly, a process is provided for the manufacture of consistently patterned and pigmented preforms of urea thermosetting plastic molding compound combined with certain other materials which act to produce a fracture resistant, aqueously insoluble end product suitable for use in the button and like industries.

The process includes material formulation and the limiting parameters thereof. Specific, step by step instructions for material production and detailed descriptions of all standard and special equipment utilized in said process. Included is a method for re-establishing the minimum necessary water levels in dried preforms which may be used either immediately subsequent to drying or subsequent to extended atmospheric exposure thereby providing a method for extending shelf life. Alternate pug clamp layering techniques are described demonstrating the versatility of design of the process. In alternate embodiments of the process, methods are provided to: permit storage of material in process, extrude and slice wet material in a single operation, produce specific logos and patterns in the finished products, provide alternate means of dry material preparation and storage, produce a finished product with the coloration of marble and permit pug compression in the extruder. In addition, specialized molding press parameters are discussed in depth.

Figure 1:
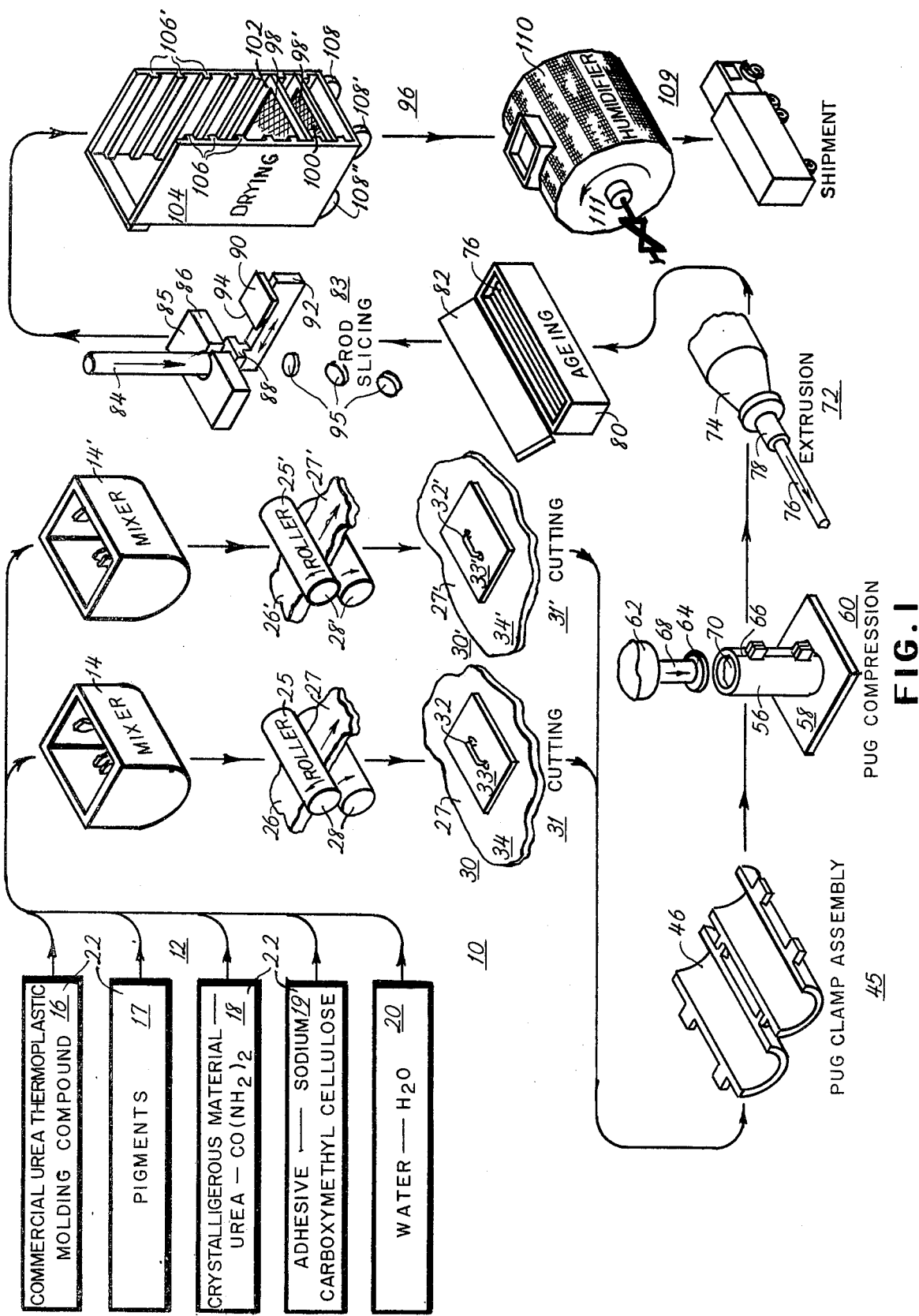
FIG. 1 is a schematic diagram of the process of this invention showing the general manufacturing steps.

Referring now to the Figures, a process for the manufacture of consistently patterned preforms for use in the manufacture of buttons and similar products of urea thermosetting plastic molding compound is schematically represented generally at 10 in FIG. 1. Urea Formaldehyde resins such as Beetle and Plascon are well known as thermosetting resins as is set out in *Handbook of Plastics* by Herbert Simonds and Carleton Ellis at page 196, and published by Van Nostrund in 1944 (4th printing). The illustrated process 10 utilizes certain dry chemicals and water schematically represented generally at 12 which are combined in color consistent batches in one or more standard commercial mixers schematically represented at 14 and 14' by combining specific quantities of the commercial urea thermosetting plastic molding compound 16 with the corresponding requirements of pigment 17 crystalligereous material 18 and adhesives 19 and mixing thoroughly. Then, after the dry materials indicated generally at 22 are homogeniously blended, water at a specific temperature is added to the mixers 14 and 14' in specific volumetric quantities per unit weight of dry material 22 present in order to produce a consistently aquiated, self-adhesive, pliable mass with the viscosity and consistency of putty after mixing.

More specifically, the actual proportional amounts of each material and the temperature of the water employed in the process are considered essential variables. The specific parameters for each of these variables are hereinafter detailed:

Pigments 17 should be colorfast and the quantities used should be the minimum amount required to reach the desired hue in the finished produce. Over pigmentation causes an opaque appearance and may also cause the bleeding of colors within the pattern during molding. If the normal acidity (ph 6.5) of the aquiated urea tends to fade pigments, especially red pigments such as Selkirk Red manufactured by Hercules, Inc., small quantities of a non-pigmented base material such as potassium carbonate may be added to neutralize the material's acidity. Color comparisons may be performed in dry pigmented materials by placing small amounts in sample molds. This comparison may be done without prior aquiation of the material in most instances.

Crystalligerous material 18 which more specifically is commercial urea [CO(NH$_2$)$_2$] has several effects on preforms and finished molded products. As proportionate quantities of urea are increased from 0% to 3% by weight, it is believed the preforms harden more quickly and the molded end product displays greater translucency but are softer and less color fast after molding. Specific quantity requirements may vary slightly, and are dependent upon the manufacturer of the thermoplastic molding compound, but are believed to be best with urea quantities at 1% by weight of the total dry constituents.

Sodium Carboxymethyl Cellulose 19 the adhesive commonly referred to as gum cellulose is utilized to give the aquiated mass a self-adhesive quality necessary for forming and shaping. It is believed that in the molded finished product, the adhesive 19 is suspended in the resin 18 in a manner not unlike the alpha cellulose used in the molding compound 16 is suspended in urea resin. While increased amounts of gum cellulose make the aquiated mass more self-adhesive, they also tend to weaken the finished product and may discolor or cloud it when used extensively. Specific quantity requirements for gum cellulose vary slightly dependent upon the manufacturer of the thermoplastic molding compound 16 but are generally believed best at 2% by weight of the total dry constituents.

Specific quantities of water and the temperature of said water at the moment of combination is the final essential variable. Normally, temperatures varying from 5° C. (41° F.) to 60° C. (140° F.) are employed with these variations producing specific effects. Generally, as water temperatures are increased, self-adhesion is increased, therefore, mixing time is decreased. Additionally, the minimum amount of water required to produce a uniformly aquiated self-adhesive mass is decreased with temperature elevation. Elevated water temperatures promote crystalline build-up rate which decreases the work life of the mass but facilitates extrusion 72 immediately subsequent to pug compression 60 without necessitating an intermediate pug aging step, thereby reducing the total production time. Additionally, it is believed that extrudability, density and durability of the resultant extruded preforms are inversly proportional to water quantities. Under normal conditions an aquiated mass is readily workable and has at least an 8 hour working life when such mass contains 59% powder and 41% water by weight. This can be varied from 61% dry, 39% water to 53% dry, 47% water, however, working life is shortened when water quantities are reduced beyond 41% and extrudability of the pug shows marked degradation when water quantities exceed 44% of when water of less than 32.2° C. (90° F.) is used.

After preparation of the aquiated material, a sufficient portion of the material 26 and 26' is rolled flat and to a predetermined thickness in a bread dough roller 28 and 28' or similar equipment to produce a void free slab with a length and width greater at all points than the size required 27 and 27'. If voids in the material exist or if the size is not correct, the material can be folded on itself and rerolled, at which time additional material may be added if required. Size requirements vary from part to part and are as required to produce the specific pug layout or design.

The aquiated material 26, 26', 27 and 27' adheres to many surfaces commonly used to manufacture rollers 28 and 28' and other equipment coming in contact with wet material. Since the adhesion of such material 26, 26', 27 and 27' to the rollers 28 and 28' might prevent the expeditious production of a solid slab of material free from voids, an exemplary method is introduced to prevent adhesion, thereby expediting production. Certain plastic materials such as polyethylene, nylon and teflon as well as certain other materials do not adhere to the aquiated mass 26, 26', 27 and 27'. Adhesion protection can therefore be afforded by either coating the effected machine component with a non-adhesive material or by the sheathing of the aquiated mass in a film of said non-adhesive material.

After rolling, the slab 27 and 27' is then prepared for the cutting operation indicated generally at 30 and 30' by placing it on a non-adhesive flat surface 31 and 31'. A template 32 and 32' with the width and length of the desired component is placed on the slab 27 and 27' and the operator, using a knife or similar implement cuts around the periphery of the template 32 and 32' thereby severing the desired portions 33 and 33' beneath the template from the undesired portion 34 and 34' which is rerolled when that specific colored or tinted material is required. The rolling 25 and 25' and cutting 30 and 30' operations, and the volumetric metering of the aquiated mass is thereby performed.

A pug clamp assembly, indicated generally at 45 is then made from the precut parts using a standard extrusion pug clamp 46 generally supplied by the manufacturer of the extruder. While specific pug clamp arrangement varies dependent upon design, the material being arranged or layered in its pug clamp generally occupies 75% of the length of the pug clamp as measured along the longitudinal axis but contains approximately 90% of the volume of said clamp. When the pug clamp is closed, sealed to prevent leakage during compression 60, and mechanically secured, lineal expansion of the material within the clamp occurs along the longitudinal axis of the clamp. The action of this compression and resultant expansion is to expel entrapped air and partially bond the layers.

After final closure of the pug clamp 46 subsequent to the layering or arranging of the material in the clamp 46 the pug and pug clamp 56 are moved to the pug compression operation indicated generally at 60. The pug and pug clamp are placed upon an immovable platform 58 where a hydraulic cylinder 62 moves a pressure plate 64 compressively into the pug clamp 66 by means of a ram 68 thereby compressing the pug 70. It is believed that material surfaces within the pug which may have been dried by evaporation are reaquiated under pressure and adhesion of the constituents to each other is performed by this action. The ram 68 is then retracted thereby extracting the pressure plate 64 from the clamp 66. The clamp 66 is then removed and the pug too is moved to the extrusion operation indicated generally at 72. The pug 70 is placed in the extruder 74 and extruded into rods 76 of a convenient prespecified diameter by forcing it through an extrusion nozzle 78 with a specific inside diameter. The rods 76 are cut to a specific length and placed into a box 80 or other suitable container equipped with a lid 82 or similar device which may be closed to prevent air circulation within the container 80 thereby limiting evaporation of water from the rod 76. The rod 76 is held in the rod box 80 with the rod box lid 82 closed for a length of time of from 3 to 10 days during which time crystal growth within the rod 76 occurs along with some small amount of water evaporation. However, water levels should not be reduced to below 40% of the total weight of the material prior to slicing. Such a reduction might cause longitudinal fractures of the rod 76 or a hardening of the surface of the rod which inhibits slicing. Additionally, rod hardness due to crystalline build up and evaporation should be at least as hard as and display the consistency of commercially available licorice candy prior to slicing. Conversely, the rod should not be sufficiently hard so as to fracture or flake during slicing. After the aging period, the hardened extruded rod 84 is moved to the rod slicing operation (generally indicated at 83) where the rod 84 is placed in a slicer (generally indicated at 85) which contains certain machine elements including a method of holding the rod while being sliced 86, a method of feeding the rod 84 which method may be gravity, a device 88 to measure the portion of the rod to be sliced prior to slicing, a device 90 to slice the rod which device 90 shall contain at least 1 sharpened edge 94 and a means of propelling the knife 90 into the rod 84. Such element may be manually, mechanically or electromechanically actuated by a device generally indicated at 92.

After slicing, the still moist sliced portions are moved to the drying operation generally indicated at 96. To facilitate rapid drying, the wet sliced urea molding compound rod, hereinafter referred to as preforms, are placed on a surface to dry. To facilitate this drying, they may be placed in a thin layer on drying racks 98 and 98', consisting of a perforated or loosely woven screening material 100 and 100' where such screening permits exposure of the preforms 95 to the air from both sides druing drying. This maximizes evaporation rates. The screening or similar material is held rigid by means of a frame 102 and 102'. A multiplicity of frames may be stored for convenience in a rack generally indicated at 104 which rack may contain a multiplicity of screen frame shelves 106 and 106' to support screens 98 and 98' during the drying operation thereby minimizing space requirements for the drying operation. For mobility, the drying racks 104 may be mounted on wheels or casters 108, 108', and 108". Drying may be accomplished at normal room temperature but drying time may be shortened by lowering the humidity of the air in the region of the wet preforms. This may be done by passing air through chemical or mechanical dehumidification equipment prior to exposing the wet preforms to such air. Dehumidification may also be accomplished by elevating the temperature of air in the vicinity of the wet preforms 95 while continuously changing the air. The preforms being dried by this means must not be brought to 54.4° C. (130° F.) during the drying process since urea liquifies at this temperature and the thermosetting process will occur, preventing further molding. It is essential that a certain small percentage of water exist in the dried preform in order to expeditiously mold the thermoplastic compressively. This amount of water is extremely small, however, and it is believed to be less than 2% of the total dried preform weight. It is extremely difficult on a mass action basis, to terminate the drying of individual preforms when humidity levels within a specified preform reach a certain predetermined point. It is far easier to completely dry the preform and then reaquiate, since once dried they become insoluble in water. The humidification procedure (generally indicated at 109) consists of uniformly exposing the preforms to water saturated air. This may be accomplished by placing the dried preforms in a screened tumbler 110 equipped with a steam sparger 111 usually passing through the tumbler as an axle and tubling them, sprayingly until the proper moisture level is attained. The preforms are then packaged in non-porous containers to prevent further water loss and can be shipped in these same containers.

Figure 3:
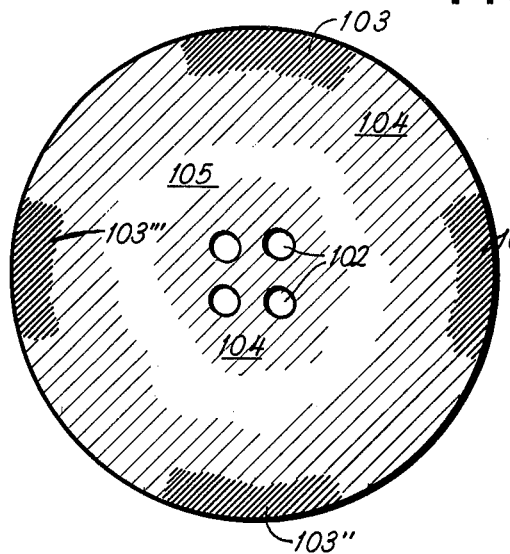
FIG. 3 is an elevation view showing the finished product produced by the layering arrangement exemplified in FIG. 2.

In an exemplary process used to produce the button depicted in FIG. 3, three batches of material of varying color and/or hue are produced in three separate mixers simultaneously. Table 1 (FIG. 21) lists the symbols used in the process to describe the material, the material's general description, manufacturer, manufacturers address, and the manufacturer's part number. The specific mixtures used are shown in Table 2, FIG. 22.

The dry ingredients are placed in 3 separate mixers 14, 14' and 14" (not shown) simultaneously, and are mixed for about 10 minutes. Separate mixers are used to reduce color contamination problems. The hot water is then added to each batch. This is mixed until it takes on the appearance of a single colored glob of soft putty. The mixing operation takes about 10 minutes at a 100 rpm mixer speed. The material is then ready for the rolling procedure indicated generally at 25 and 25'.

Figure 2:
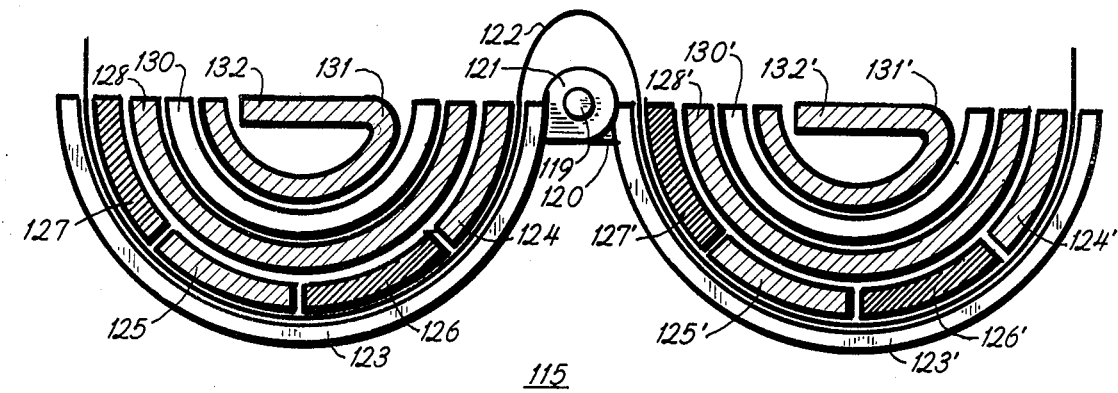
FIG. 2 is an elevation end view of a prior art pug assembly clamp showing the layering arrangement for a semetrically circular design.
Figure 4:
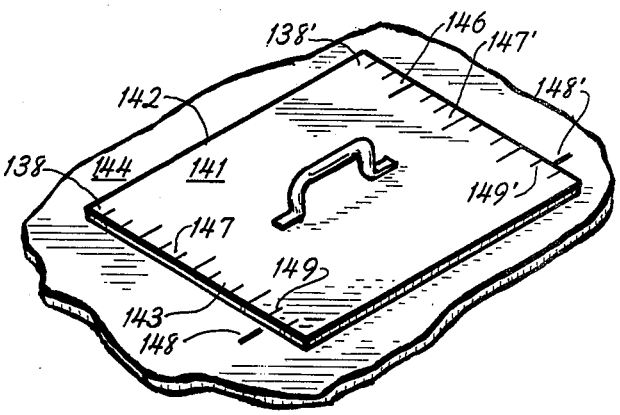
FIG. 4 is an isometric view showing the placement and use of the pug layer cutting template.
Figure 5:
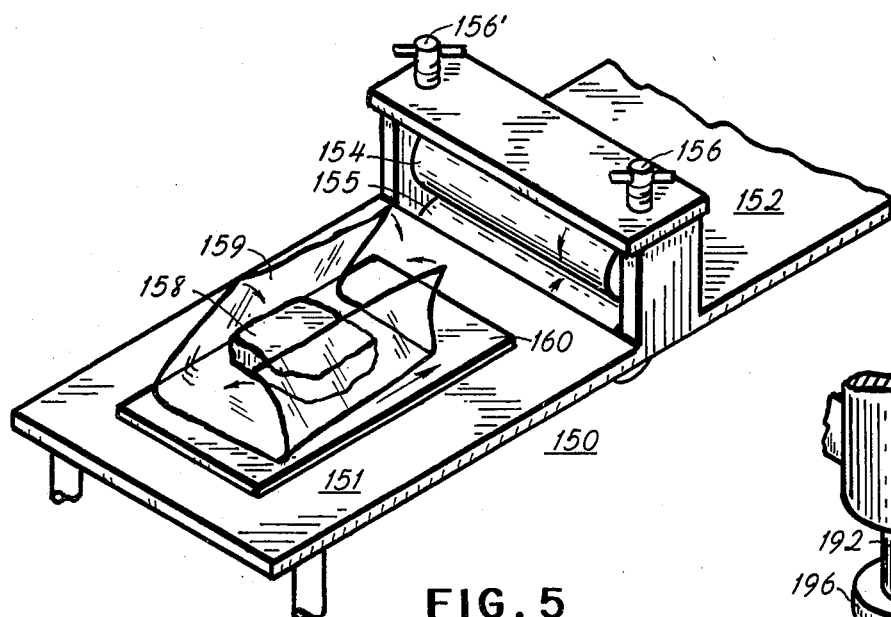
FIG. 5 is an isometric view showing the placement, preparation and wrapping in plastic film of aquiated molding compound prior to rolling.

The aquiated material is rolled in a bread roller indicated generally at 150 in FIG. 5 and containing full roller width flat surfaces 151 and 152 adjacent to the entry and exit points of the rollers 154 and 155. The rollers 154 and 155 are adjustable in relationship to each other by means of jack screws 156 and 156' or similar devices which may or may not be calibrated, and are driven by manual, mechanical, electromechanical or other suitable means in a manner adequate to propel an aquiated mass 158 through the rollers. Prior to the actual rolling procedure, the aquiated mass 158 is encased in a sheet of 0.006 thick polyethylene film 159 which is mechanically secured by glue or mechanical fastening devices to a sheet of masonite 160 or the like, having one rough side, which is placed downward to contact the roller 155 during the rolling operation thereby increasing the forward thrust due to friction. The material 158 is then rolled and the polyethylene film 159 is opened. If voids appear or if the resultant material is not larger than the desired size, the material is folded to provide thickness for compression, or material is added if necessary, and the mass 158 is rewrapped in the polyethylene film 159 and rerolled. Generally 2 to 4 rollings are required to produce a flaw-free sheet. After the material is rolled and before it is removed from the rolling boatd 160, it is cut into the desired size using a cutting template. The cutting operation, generally indicated at 140 in FIG. 4 is performed in the following manner. A cutting template 141 with a width along side 142 equal to 75% of the total length of the pug clamp and with a depth along side 143 equal to ½ of the inner circumference of the pug clamp is placed on the rolled material 144 using the handle 145 for convenience. The template is equipped with incrementation indicated generally at 147 and 147', which are utilized in the cutting operation. A dull knife similar to a butter knife is used to slice the rolled slab 144 along sides 142, 143, and 144. A mark 148 and 148' is placed on the slab 144 adjacent to the incrementation indicating the proper width 149 and 149' for the piece desired. The clamp 141 is then moved until corners 138 and 138' are adjacent to the indication marks 148 and 148' and then the knife is used to cut along side 142, severing the desired piece of aquiated material. In the exemplary procedure, material is rolled, cut, and assembled to produce the pug clamp design indicated generally at 115 in FIG. 2, the elevation view of the pug clamp, wherein a Giusi (of Italy) pug clamp comprised of 2 half circular sections 123 and 123' with an inside diameter of 200 mm and a length of 600 mm and a thickness of 10 mm being connected by hinge sections 120 and 121 and hinge pin 119 are placed on some suitable surface in the open position. The pug clamp is then lined with a piece of polyethylene film 122 to prevent adhesion of the material to the clamp. The clamp is then layered in accordance with Table 3, FIG. 23.

The clamp is then closed causing lineal expansion of the pug within the pug clamp. After the initial closing of the clamp. The clamp is reopened and any wrinkles in the polyethylene film 122 are removed. Strips of sheet metal, acting as pug sealing fins shown as items 172 and 174 of FIG. 6 each of which in the exemplary process are 50 mm wide, 625 mm long and 1.25 mm thick, are placed between the polyethylene film and the pug clamp at the hinge and closure seams 176 in such a manner that they overlapped the seams after closing. These seals 176 are placed even with end 178 of the pug clamp 180 but extended beyond the other end 182. The clamp is then closed and mechanically fastened by some suitable means 184 and 184'.

Figure 17:
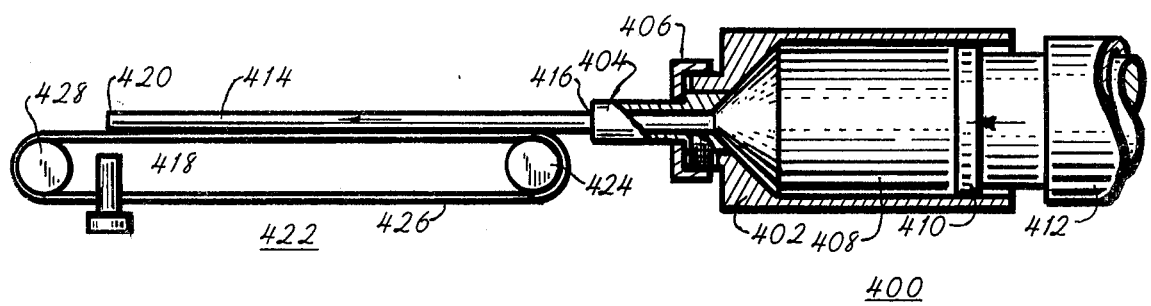
FIG. 17 is an elevation view partially in section showing an extruder and an associated conveying device for extruding patterned preform rod.

The pug clamp 180 is placed on the table 188 of an arbor press indicated generally at 186 having an adjustably immovable table 188, a hydraulically operated cylinder 190 and ram 192 with upright coupling posts 194 and 194' connecting the cylinder 190 and table 188. Further, the ram 192 is equipped with a steel plate 196, 25 mm thick and 2 mm smaller in diameter than the indise diameter of the pug clamp 180. Any excessive polyethylene film 122, FIG. 2, protruding past the pug 198, FIG. 6, in the pug clamp 180 is folded down on the pug forming an upper seal 200. The pug clamp 180 is then placed directly under the plate 196 which is compressively lowered into the pug clamp 180 using the sheet metal fins 172 and 174 which extend above the pug clamp 180 as guides. The pug is compressed at not less than 35.75 Kg/cm$^2$ until a small portion of the aquiated material (less than 100 g) leaks between the pug clamp 180 and the plate 196 thereby becoming visible or until a period of not less than 30 seconds elapses. After compression, the ram 192 is retracted thereby extracting the plate 196 from the clamp . The clamp 180 is then laid horizontally on the table 188 and opened. The pug 198 is removed and stored in a polyethylene bag to prevent water evaporation until it is loaded in a Guisi extruder indicated generally at 400 in FIG. 17. Before loading the pug 408 into the extruder housing 404, a property sized extruder nozzle 404 is selected in accordance with the parameters specified in Table 4, FIG. 24 to provide the desired effect.

Figure 18:
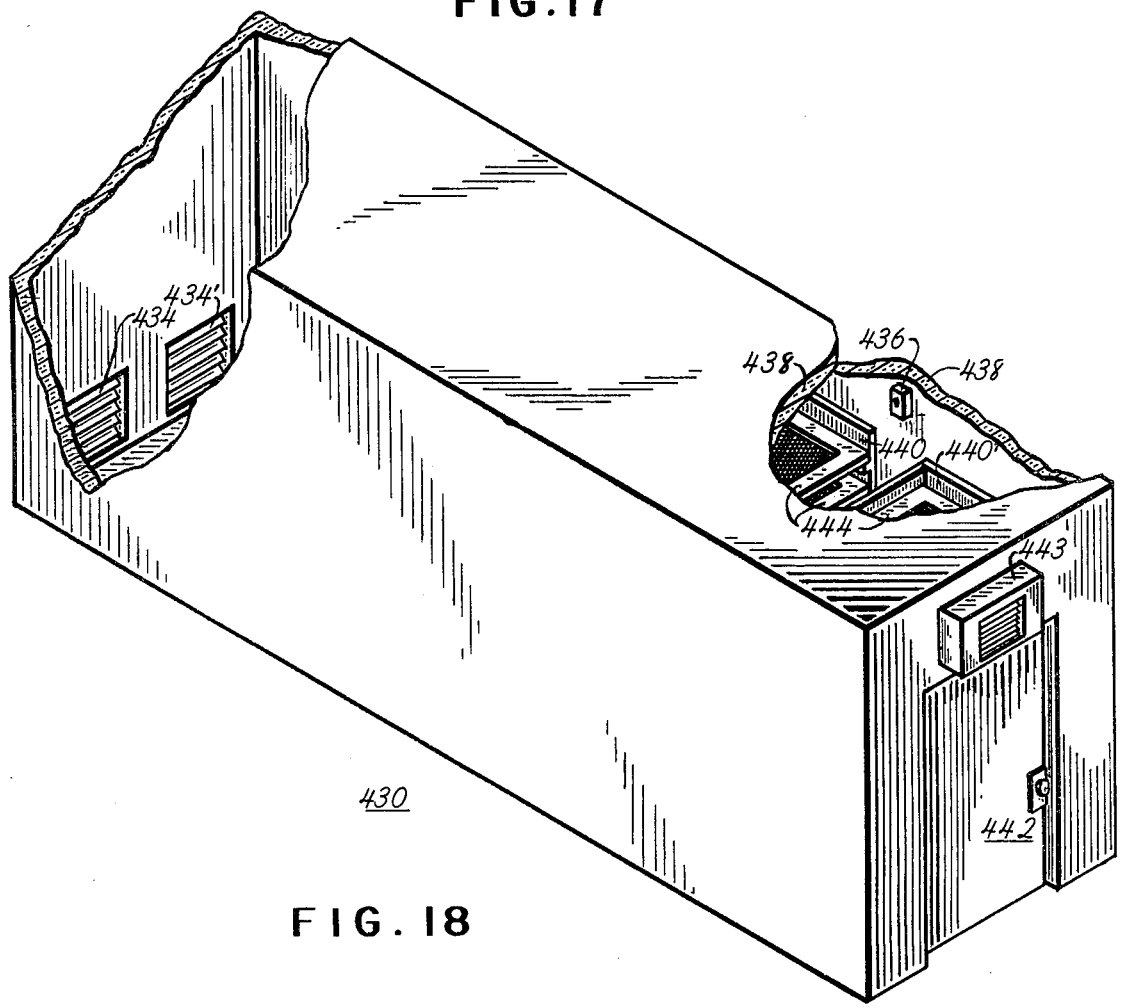
FIG. 18 is an isometric view partially broken away showing the arrangement of an exemplary drying room.

The extruder nozzle 404 is mounted in the extruder housing 402 by means of the extruder nozzle locking not 406. The pug 408 will all polyethylene film removed is placed in the extruder housing 402 and the extruding ram 410 is brought up to the pug 408 by means of the hydraulic activating cylinder 412 forcing the extruded material as a soft rod 414 out of the nozzle 404. Immediately in front and slightly below the extrusion nozzle 404 is a belt-type conveyor indicated generally at 412 and comprised of a drive pulley 424 which may be driven either manually, mechanically, hydraulically, or electromechanically and propels a belt 420 over loosely adjusted idler pulley 428. The travel speed of the conveyor belt 426 is set slightly faster than the travel speed of the extruded rod 414, but the idler pulley 428 is set loosely, allowing the frictional drag of the extruded rod 414 to synchronize the belt speed while the belt 426 maintains some drag on the rod 414 which keeps it straight. A visual indication 418 of some type is placed at a convenient distance from the nozzle 404 to indicate a consistent point of termination for the wet extruded rod 414. Termination is performed in the following manner. When the leading end of the wet rod 420 being extruded reaches a point adjacent to the visual indicator 418 the rod is clasped at either end by the operator who severs the rod at 416 next to the nozzle. The rod is then placed into a container or rod box for aging. Care is taken to place the rod in a relatively straight position since kinks or bends in the rod may create difficulties in the slicing operation. Additionally, if a multiplicity of layers of rod are stroed in the same rod box, then sheets of paper toweling should be placed between the layers. The paper toweling serves to prevent adhesion of the layers and also acts as a capillary conductor of excess moisture and thereby maintains equilibrium in water distribution. The rod box is then closed, encased in a polyethylene bag to prevent evaporation, and stored from 3 to 5 days at which time is is placed in a Lupomatic rod slicing machine as produced by J. Lupo Tumbling Machine, Ltd. and cut to a thickness which produces the desired weight. Weight is determined in accordance with the following formula:

$$\frac{(1.1B)(D + W)}{D} = P \frac{+10\%}{-10\%}$$

where
B = weight of finished button to be molded
D = weight of dry ingredients in mixture
P = weight of wet preform
W = weight of water in mixture After slicing, the preforms are placed in a thin layer on screens 444, FIG. 18 and the screens are loaded in racks 440 which have the fronts and backs open to permit air circulation. The racks 440 which are mounted on wheels 446 to facilitate movement, are placed in a drying area which consists of a long, insulated room indicated generally at 430 with an inside width slightly greater than the width of the racks 440, a height about 0.5 I m higher than the racks 440, and a length sufficient to accommodate the desired number of racks. At or near one end is a door 442 of sufficient size to permit easy entry of the racks 440 at one end and near the top of the room is a forced circulation space heater 432 of sufficient size to heat the room from minimum normal ambient temperatures to 48.8° C. (120° F.) in ½ hour. Directly in the path of the forced air flow, 2 m to 3 m in front of and adjacent to the ceiling, is located a high temperature thermostat 436 whose position insures the sensing of maximum room temperatures. At the opposite end of the room, adjacent to the floor, are exhaust vents 430 and 430' open to the outside. Furthermore, the room 430 is insulated 438 throughout to minimize heat loss. The thermostat 436 which has an error factor of +3° C. is set at 43.5° C. (110° F.) and the wet preforms are placed in the room for a period of from 1 to 3 days. After which time the dried preforms should display a hard unfractured surface.

After drying, the preforms are placed in a wire screen tumbler equipped with a steam sparger, which equipment is generally used for shotting and dulling buttons. After loading, the tumbleris started, insuring uniform exposure of all the preforms to the spray. The the steam is turned on for a period of from 6 to 8 seconds after which the preforms should be damp to the touch on all surfaces. The preforms are then placed in polyethylene bags to prevent evaporation during storage and shipped. Surface moisture existing on the preforms at the time of bagging is absorbed within 48 hours by the preforms.

The exemplary procedure herein described produces the finished button generally indicated at 100 in FIG. 3 which is colored with dark burnt umber 103, 103', 103", and 103''' periphery markings about a white 105 ring against a light tan 104 and 104' background. With simple substitutions of coloration, layer thicknesses and pug clamp layouts, an infinite variety of colors and patterns may be created. As an example, two commonly produced buttons depicted generally at 300 in FIG. 13 and 336 in FIG. 15 may be produced with molded holes simply by substituting alternately colored material and using the pug clamp arrangements indicated generally at 308 in FIG. 14 and 344 in FIG. 16 respectively.

Figure 13:
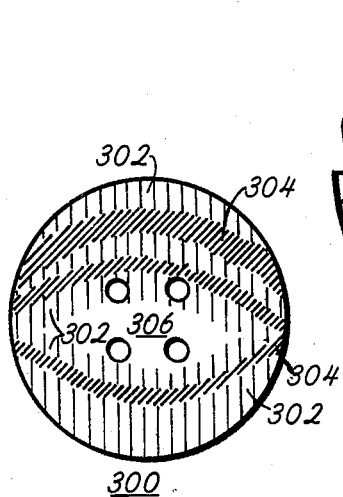
FIG. 13 is a pictorial elevation view describing the coloration of button prepared by the process herein described but arranged in the pug in the manner described in FIG. 14.
Figure 14:
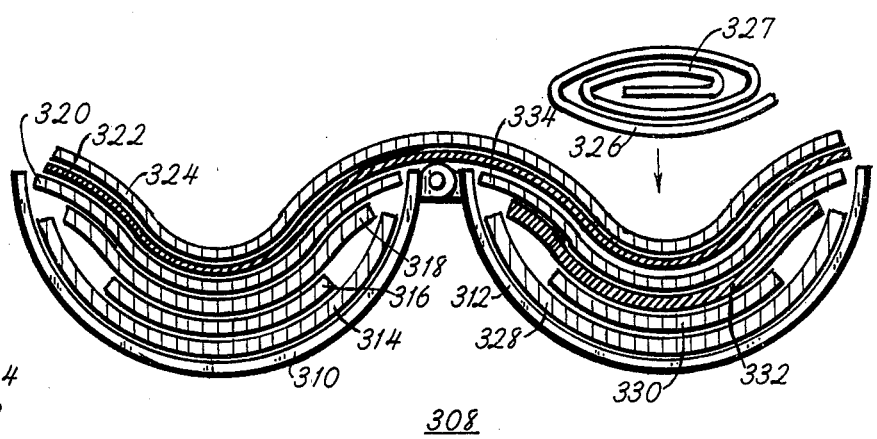
FIG. 14 is an elevation end view of the pug clamp layout for the button described in FIG. 13.

More specifically, the button pictorially described in FIG. 13, indicated generally at 300 and containing a pattern of dark brown 304 and stripes on a red 302 background with a which 306 center is assembled using the pug clamp arrangement indicated generally at 308 of FIG. 14. The left 310 pug clamp half and the right 312 pug clamp are assembled according to Table 5, FIG. 25.

Figure 15:
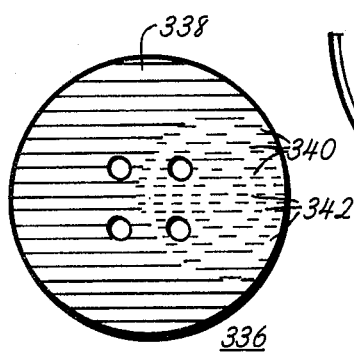
FIG. 15 is a pictorial elevation view describing the coloration of a button prepared by the process herein described but arranged in the pug in the manner described in FIG. 16.
Figure 16:
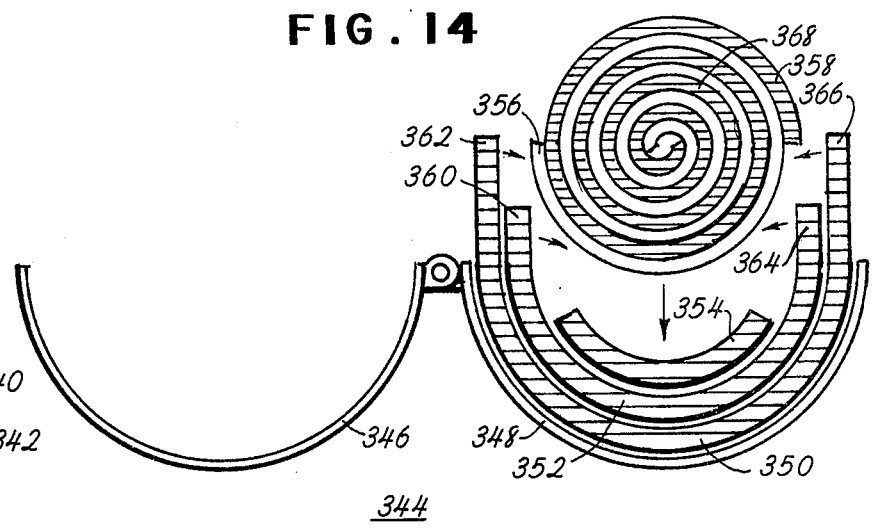
FIG. 16 is an elevation end view of the pug clamp layout for the button described in FIG. 15.

The button pictorially described at 336 in FIG. 15 and containing a dark blue 340 and white 342 spiral pattern eccentrically placed on a light blue 338 background is assembled using the pug clamp arrangement indicated generally at 344 in FIG. 16 and is assembled according to Table 6, FIG. 26.

In an alternate embodiment of the process indicated generally at 10 in FIG. 1, means are provided for the storage of aquiated material between the mixing 14 and 14' and rolling 25 and 25' steps, the pug compression 60 and extrusion 72 steps or any other pair of sequential steps. By this means, storage is accomplished without incurring dehydration or crystalline build up problems in the material. More specifically, if aquiated material in any form is wrapped to prevent water evaporation and subjected to temperatures below $-15°$ C. (5° F.) thereby freezing the material, the material when thawed will return to the state and degree of plasticity exhibited prior to freezing. A method is thereby provided for the storage of aquiated material in order to facilitate production scheduling.

In an alternate embodiment of the process indicated generally at 10 in FIG. 1 and utilizing newly designed equipment available in Europe, extrusion and slicing are performed on a single machine on one operation according to the manufacturer of said machine.

In an alternate embodiment of the process indicated generally at 10 in FIG. 1, a method of producing finished material with specific patterns such as flowers, coats of arms and the like is introduced. More specifically, in the process generally indicated at 10 in FIG. 1 the rolling 25 and 25' and cutting 31 and 31', operations are deleted. In place of steps 25 and 31, the material to be placed in the pug clamp 46 is molded or extruded as a prism or cylinder whose cross section is the size and configuration of the patterned part. No volumetric allowance is made to expel air at pug clamp closing as is done in the preferred embodiment since preformed parts fit well and since such compression tends to deform the pattern. In such instances, the molded or extruded components are usually cut to the desired length of 90% of the pug clamp. Pug compression is performed as in the process generally indicated at 10 of FIG. 1.

Figure 7:
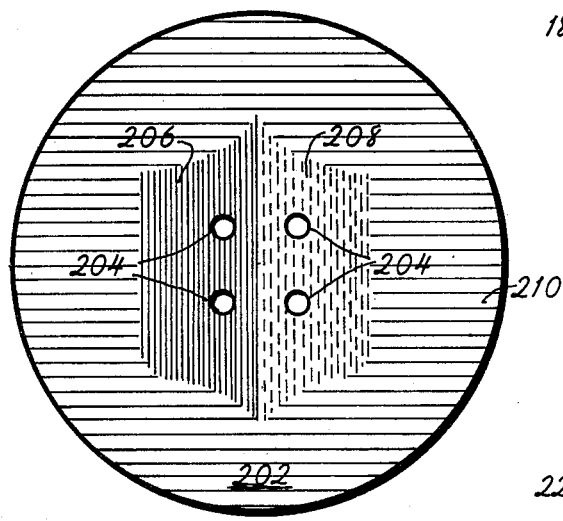
FIG. 7 is an elevation view showing the exemplary pattern and coloration of a button whose preforms were prepared from molded sections.
Figure 8:
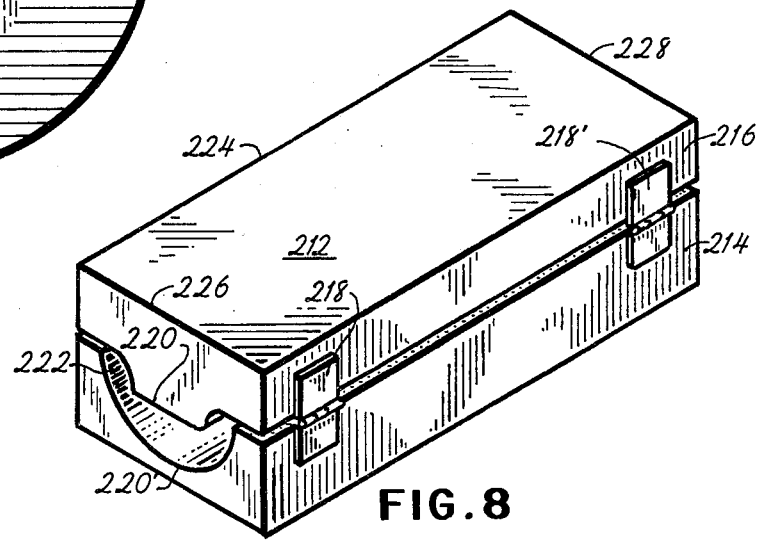
FIG. 8 is an isometric view of a prior art mold used in the molding of half of the outer blue protion of the button depicted in FIG. 7.

In an exemplary procedure which produces the button generally indicated at 202 in FIG. 7, containing holes 204 and a red 206 and purple 208 shield on a light blue background 210, the red 206 and purple 208 shield portions are produced in one mold while the blue 210 background is formed as two halves in another mold indicated generally at 212 in FIGS. 8. The mold 212 is comprised of two segments 211 and 216 which may be hinged 218 and 218' and which mold 222 has the desired configuration 222 cut into them from end 226 to end 228 and whose length along side 224 is equal to 90% of the pug length of 540 mm. The inner molding surfaces 220 and 220' which contact the material are coated with polyethylene. The mold is opened, filled to overflowing with the desired material and then closed, thereby compacting the material. Excess material flowing out the ends is severed flush with 222 and 228. The mold is then opened. If voids exist, additional material is added and the process is required. If not, the molded component is placed in the pug clamp.

In an alternate embodiment of a portion of the process described generally at 10 in FIG. 1, a process is described generally at 230 of FIG. 9, methods are given for the mixing and pigmentation of dry constituents which are indicated generally at 232 prior to the mixing step indicated in the process described in FIG. 1. Alternate mixing procedures are disclosed to provide high volume material production capabilities to the processes described in FIG. 1 and FIG. 10.

In FIG. 9, urea thermoplastic molding compound 234 is combined with pigments 235 in large quantities in a commercial ball mill 239 as a pigmented molding compound. Additionally, urea 236 and sodium carboxymethyl cellulose 237, hereinafter referred to as gum cellulose, may be added to the material in the ball mill 239, at the manufacturer's discretion. If full strength material is produced, it is wisest to add the urea 236 and gum cellulose 237 at the ball mill operation indicated generally at 249, since this elimination the possibility of measurement errors in subsequent operations. After the full strength material is mixed 249, it is placed in storage 241 until required for production 245, which thereafter proceeds in accordance to the process in FIG. 1 or FIG. 10.

In an alternative to this procedure, commercially pigmented material in standard colors produced by molding compound manufacturers may be purchased, thereby eliminating operation 249. In such instances, the urea 236 and gum cellulose 237 may be added directly to the mixer 245 along with the pigmented molding compound. A second alternative is especially adaptive to pigmented materials in little used colors or when storage space is limited. In this process, urea molding compound 234 is over-pigmented to produce a color concentrate, i.e., a premixed portion of urea thermoplastic molding compound and pigment which can be combined with specific additional portions of urea thermoplastic molding compound to produce the desired material. In such cases, the required portions of color concentrate that is added to the urea thermoplastic molding compound should be sufficiently large to minimize or eliminate measurement errors and complex formulation. The color concentrate is prepared in a ball mill 239 and stored prior to use 241. When required, the concentrate may be combined with additional urea thermoplastic molding compound 234, urea 236, and gum cellulose 237 in a barrel tumbler 243 immediately prior to use or the necessary materials may be added indirectly to the mixer 245 and be blended therein. This method of color concentrate preparation permits the matching of colored material in large quantity by qualified personnel without necessitating large storage areas and expensive inventories.

An alternate embodiment of a portion of the process described in FIG. 1 is generally indicated at 256 in FIG. 10 wherein urea thermoplastic molding compound 258, pigments 260, urea 262, and sodium carboxymethyl cellulose 264, hereinafter referred to as gum cellulose, are combined to form two or more hued materials in one or more mixers 266, 266', and 266'' and the dry material is mixed as in the process described in FIG. 1. Chilled water 268 at between 0° C. (32° F.) and 15° C. (59° F.) is added to the mixer(s) 266, 266', and 266'' and the aquiated material is stirred until it is converted into small (1 cm to 5 cm diameter) globules at which point mixing is stopped. The material is removed from the mixers and specific amounts of two or more variously colored batches are placed in a mixer 270 and agitated just long enough to thoroughly mix but not combine the colored materials. The mixing is then stopped. The material is placed in a suitable container 272 such as a pug clamp, extruder barrel or the like and compressed into a single mass by a hydraulic ram or the like 274 after which the material is extruded (indicated generally at 276) and processed as indicated in FIG. 1. Thusly, the expensive hand labor involved in pug layering is eliminated.

Figure 6:
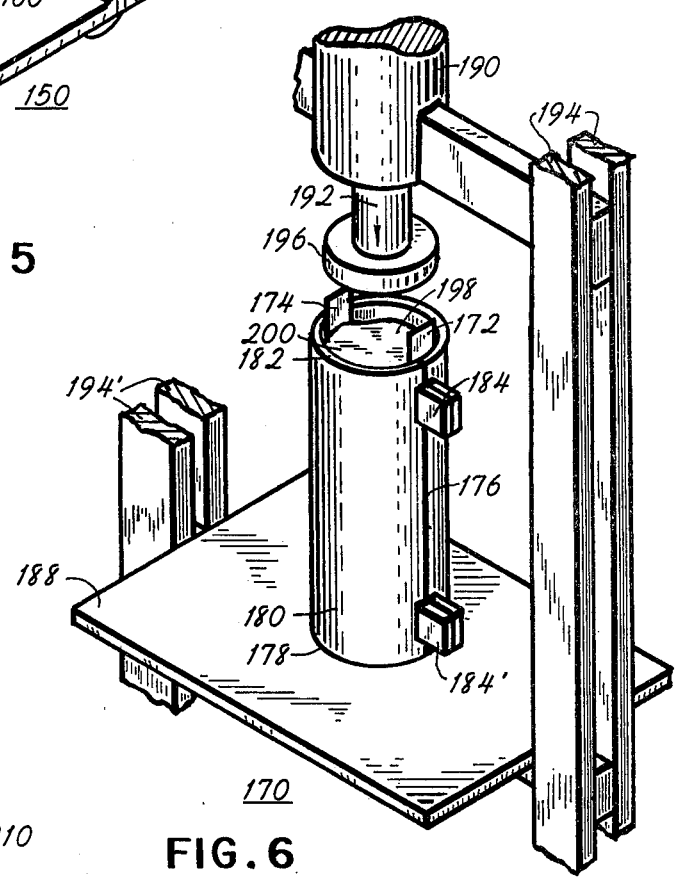
FIG. 6 is an isometric view showing the positioning of the pug clamp, location of pug clamp leak protection gaskets and positioning of the compression equipment in an exemplary procedure.
Figure 11:
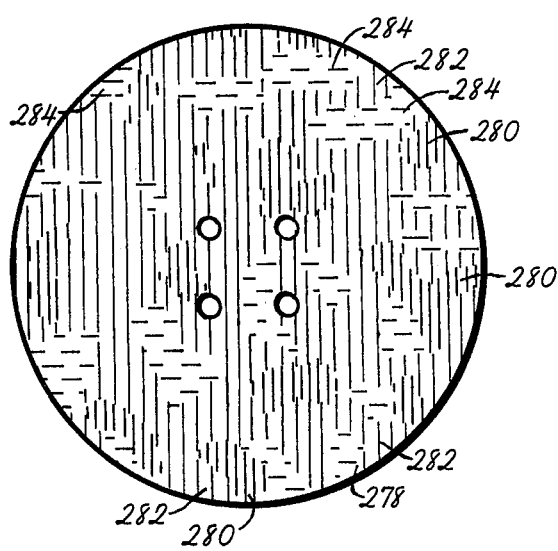
FIG. 11 is an elevation view describing the coloration of a button whose preform was prepared by the process described, in part, in FIG. 10.

In an exemplary process used in produce the button indicated generally at 278 in FIG. 11, which contains vaguely defined blotches of dark burnt sienta 280, light burnt sienta 282, and gray 284 which were mixed 20% dark burnt sienta 280, 50% light burnt sienta 282, and 30% light gray, and which coloration approximates the appearance of Tennessee pink marble, the material is compressed in the following manner. A pug clamp, indicated generally at 180 in FIG. 6 is placed in a locked condition with its longitudinal axis vertical on the table 188 of a 12 ton arbor press, indicated generally at 186. The clamp 182 is lined with a bag made of woven nylon material, which permits escape of entrapped air. The bag is subsequently filled with the material produced in the mixer indicated at 270 of FIG. 10. Two pieces of sheet metal indicated at 172 and 174 of FIG. 6 are slipped between the plastic liner and the pug clamp 180 at the pug clamp closure seams 176. The woven nylon bag is folded across the material and the pug clamp is placed directly beneath the compression plate 196. The material is compressed into a single mass. When the compression plate 196 is removed, the bag may be opened at the top of the pug clamp 182 where upon additional material may be added and the compression steps repeated. This is done until the pug clamp is full. After filling and final compression, the newly formed pug 198 is removed from the clamp, unwrapped and aged or extruded as in the preferred embodiment of the procedure described generally at 10 in FIG. 1.

In an alternate embodiment of the process, pug compression indicated generally at 60 in FIG. 1 and 273 in FIG. 10, is produced by placing the loosely associated material which had been slightly compressed by the closing action of the pug clamp into an extruder (74 of FIG. 1 and 276 of FIG. 10) where the extrusion nozzle (78 of FIG. 1 and 277 of FIG. 10) has been plugged. The extrusion process is begun, causing pug compression. Pressure is released, the nozzle (78 of FIG. 1 and 277 of FIG. 10) is changed to one with an appropriate orifice, and the material is extruded.

Figure 19:
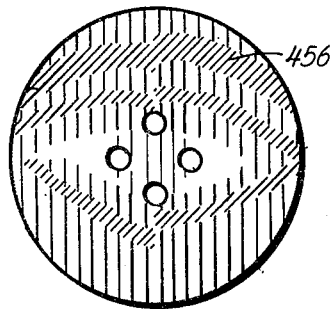
FIG. 19 is a pictorial elevation view of a button displaying characteristic pattern disturbance which commonly occurred in buttons manufactured according to the prior art process.
Figure 20:
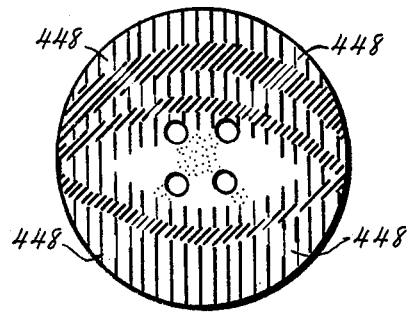
FIG. 20 is a pictorial elevation view of a button displaying characteristic "knit" lines.

The molding of dried preforms subsequent to manufacture may be performed in any standard thermocopressive molding press such as made by Stokes Co., Inc. and the like, provided that such press is programmable and capable of exerting pressures of from 39 Kg/cm2 (1,400 lbs./in.2) to 80 kg/cm2 (3,000 lbs./in.2) at the proper molding temperature of 149° C. (300° F.) to 166° C. (330° F.). Additionally, the preforms may be molded into buttons with or without holes without significant pattern disturbance. When manufactured with holes, the manufacturing costs are substantially reduced. In certain finished products with extremely thin cross sections and holes, no special or specific press closing parameters are required. But in most patterns, a pre-heating cycle is required immediately preceding contact of the preform by the upper and lower cavities. This pre-heating cycle may vary from 0.25 to 15.0 seconds dependent upon preform thickness, but this time should be held to an operational minimum. Generally 60% of the pre-heating time should be deducted from the overall curing cycle which is generally less than 60 seconds. The limiting factors are:

1. As the pre-heat cycle is shortened, the tendency of the preform to split or fracture, which is the cause of the appearance of knit lines 456 in FIG. 20 or a disturbance of pattern (exemplified in the button generally indicated at 448 of FIG. 19) is increased;

2. As the pre-heat cycle is extended, the press closing pressure is elevated and eventually the finished product will display a dull gaseous appearance.

Figure 12:
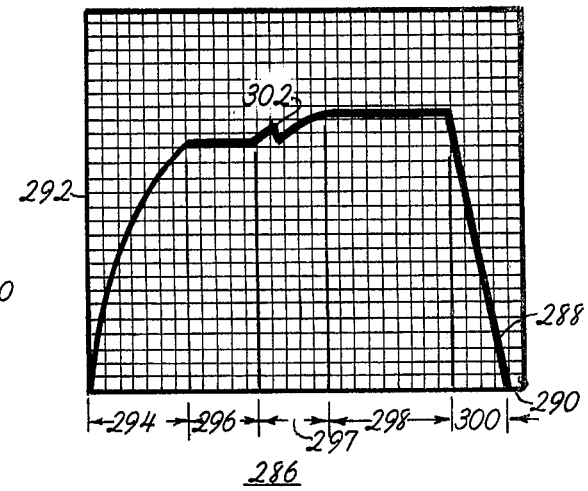
FIG. 12 is a pictorial representation of an exemplary graph of a typical thermocompressive molding press's molding cycle when utilizing preforms prepared by the process herein described.

In an exemplary press closing cycle which is graphically displayed in FIG. 12, press motion 292 is plotted vertically and elapsed time 290 is plotted horizontally. The resulting closing parameter 288 is composed of five distinct portions which are rapid closing of press 294 which terminates when the upper cavity is less than 2 mm from contacting the preform. The press then passes through a preheat phase 296 in which all press movement stops. Upon conclusion of the preheat cycle, the preform is compressively molded 297 during which operation one or more breaks 302 or momentary direction reversal may be programmed to assist in the removal of entrapped air within the preform. The formed product is then compressively held 298 until the thermosetting plastic is cured, at which time the press opens 300 and the finished molded products are removed.

Although the present invention has been discussed with respect to the specific examples, it is not intended that such specific examples be limitation upon the scope of the invention except as insofar as is set forth in the following claims.

What is claimed is:

1. A method of producing consistently patterned and pigmented preforms of urea thermosetting plastic molding compound, which preforms may be molded into buttons and the like comprising the steps of:

mixing selected amounts of the dry constituents which include urea thermosetting plastic molding compound, color pigments, crystalline urea and hydrophillic adhesives;

adding and mixing a selected amount of water with said dry constituents to obtain a preform material;

compressing said preform material;

extruding said compressed preform material to obtain rods of said preform material having a desired size and cross section;

aging said extruded preform material;

dividing said rod of preform material into preforms or blanks having a selected thickness; and adjusting the amount of water in said preforms such that said preforms are suitable for molding into buttons and the like having a desired configuration.

2. The process of claim 1 and prior to the step of compressing, further including the steps of providing at least two sheets of said preform material of desired colors and arranging said sheets in molds prior to compression to provide a selected pattern.

3. The method of claim 1 wherein said adhesive is sodium carboxymethyl cellulose.

4. The method of claim 1 or 3 wherein said dry constituents include between about zero and 3% crystalline urea, about 2% adhesive and between about 95% to 98% urea thermosetting plastic molding material.

5. The method of claim 1 wherein said selected amount of dry constituents varies between approximately 53% and 61%, and said water varies between from 47% to 39%, respectively.

6. The method of claim 1 wherein said step of compressing said preform material is accomplished in not less than 35.75 Kgms/Cm².

7. The method of claim 1 wherein said step of adjusting includes drying said preforms and then adding the necessary amount of moisture to raise said moisture content to approximately two percent.

8. The method of claim 7 wherein said drying step is accomplished at a temperature less than about 54.4° C.

9. The process of claim 7 wherein said drying step is accomplished at temperatures between 40.5° and 46.5° C.

10. A method of producing consistently patterned and pigmented molded buttons of urea thermosetting plastic molding compound comprising the steps of:

mixing selected amount of the dry costituents which include urea thermosetting plastic molding compound, color pigment, crystalline urea and adhesive;

adding and mixing a selected amount of water with said dry constituents to obtain a preform material;

compressing said preformed material;

extruding said compressed preform material to obtain rods to said preform material having a desired size and cross section;

aging said extruded preformed material;

dividing said rods of preform material into preforms or blanks having a selected thickness;

adjusting the percentage of water in said preforms; and molding said preforms into a selected shape to produce buttons.

11. The process of claim 10 wherein said molding step molds holes in said buttons.

12. A method of providing a molding material suitable for forming into preforms which in turn are suitable for molding into buttons and the like, comprising the steps of:

mixing selected amounts of the dry constituents which include urea thermosetting plastic molding compound, color pigment, crystalline urea, and adhesive; and adding and mixing a selected amount of water with said dry constituents to obtain said molding material.

13. The process of claim 12 wherein said adhesive is sodium carboxymethyl cellulose.

14. The method of claim 12 wherein said dry constituents include between about zero and 3% crystalline urea, about 2% adhesive and between about 95% and 98% urea thermosetting plastic molding material.

15. The method of claim 12 wherein said selected amount of dry constituents ranges from about 53% and 61%, and said water ranges from about 47% to 39% respectively.

* * * * *